United States Patent
Yoshida et al.

(10) Patent No.: US 11,296,315 B2
(45) Date of Patent: Apr. 5, 2022

(54) BATTERY

(71) Applicant: TOYOTA JIDOSHA KABUSHIKI KAISHA, Toyota (JP)

(72) Inventors: Jun Yoshida, Mishima (JP); Daichi Kosaka, Susono (JP); Takamasa Otomo, Gotemba (JP); Hideyuki Nakano, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 16/504,616

(22) Filed: Jul. 8, 2019

(65) Prior Publication Data

US 2020/0020936 A1    Jan. 16, 2020

(30) Foreign Application Priority Data

Jul. 13, 2018  (JP) .............................. JP2018-133326

(51) Int. Cl.
*H01M 4/36* (2006.01)
*H01M 10/0525* (2010.01)
*H01M 10/054* (2010.01)
(Continued)

(52) U.S. Cl.
CPC ......... *H01M 4/366* (2013.01); *H01M 10/054* (2013.01); *H01M 10/0525* (2013.01); *H01M 10/0565* (2013.01); *H01M 10/0566* (2013.01)

(58) Field of Classification Search
CPC ............. H01M 4/366; H01M 10/0525; H01M 10/054; H01M 10/0565; H01M 10/0566;
(Continued)

(56) References Cited

U.S. PATENT DOCUMENTS 8,414,858 B1 * 4/2013 Nolas ........................ C30B 1/12
423/344
8,968,929 B2 * 3/2015 Chan ................. H01M 10/0525
429/218.1

(Continued)

FOREIGN PATENT DOCUMENTS

JP              6003996 B2 * 10/2016 .............. H01M 4/38
KR    10-2015-0060802 A    6/2015
(Continued)

OTHER PUBLICATIONS

Wagner, Nicholas A., et al. "Electrochemical cycling of sodium-filled silicon clathrate." ChemElectroChem 1.2 (2014): 347-353. (Year: 2014).*

(Continued)

*Primary Examiner* — Maria Laios
*Assistant Examiner* — Grace Ann Kenlaw
(74) *Attorney, Agent, or Firm* — Oliff PLC (57) ABSTRACT

A main object of the present disclosure is to provide a battery with excellent capacity. The present disclosure achieves the object by providing a battery comprising a cathode layer, an electrolyte layer, and an anode layer, in this order, and the anode layer includes a silicon clathrate compound, as an anode active material, the silicon clathrate compound has a composition represented by $M_xSi_{46}$, wherein M is a metal element, x satisfies $0<x<46$, and includes a crystal phase of a Type I silicon clathrate, and an average primary particle size of the silicon clathrate compound is 50 nm or more and 3000 nm or less.

8 Claims, 4 Drawing Sheets

Type I silicon clathrate (51) Int. Cl.
   *H01M 10/0565* (2010.01)
   *H01M 10/0566* (2010.01)
(58) Field of Classification Search
   CPC .............. H01M 4/134; H01M 4/386; H01M 2004/027; H01M 2004/021
   See application file for complete search history.

(56) References Cited

U.S. PATENT DOCUMENTS

| | | | |
|---|---|---|---|
| 2012/0021283 A1 | 1/2012 | Chan et al. | |
| 2015/0243986 A1* | 8/2015 | Negi ................ | H01M 4/362 252/182.1 |

FOREIGN PATENT DOCUMENTS

| | | | | |
|---|---|---|---|---|
| WO | WO-2012117991 A1 * | 9/2012 | ............ | H01M 4/661 |
| WO | 2014/050100 A1 | 4/2014 | | |

OTHER PUBLICATIONS

Machine Translation of JP6003996B2 (Year: 2016).*
Zhao, Ran, et al. "Anodes for Lithium-Ion Batteries Based on Type I Silicon Clathrate Ba8Al16Si30—Role of Processing on Surface Properties and Electrochemical Behavior." ACS applied materials & interfaces 9.47 (2017): 41246-41257. (Year: 2017).*
Fukuoka, Hiroshi, Junichi Kiyoto, and Shoji Yamanaka. "Superconductivity of Metal Deficient Silicon Clathrate Compounds, Ba8-xSi46 (0<x<1.4)." Inorganic chemistry 42.9 (2003): 2933-2937. (Year: 2003).*
Langer et al., "Electrochemical Lithiation of Silicon Clathrate-II", Journal of The Electrochemical Society, 159 (8) A1318-A1322 (2012).
Wagner et al., "Electrochemical Cycling of Sodium-Filled Silicon Clathrate" ChemElectroChem Communications, vol. 1, No. 2, Feb. 11, 2014, pp. 347-353.

* cited by examiner

Type I silicon clathrate

FIG. 2B

Diamond-type silicon

BATTERY

TECHNICAL FIELD

The present disclosure relates to a battery.

BACKGROUND ART

In recent years, the development of a battery has been actively carried out. For example, the development of a battery used for an electric automobile or a hybrid automobile has been advanced in the automobile industry. Also, as the active material used for the battery, Si particles are known.

Patent Literature 1 discloses an electrode for a battery comprising silicon clathrate. Also, Non-patent Literature 1 discloses that a compound including a crystal phase of Type II silicon clathrate is used as an anode active material for a lithium ion battery.

CITATION LIST

Patent Literatures

Patent Literature 1: United States Patent Application Publication No. 2012/0021283

Non-Patent Literature

Non-patent Literature 1: Thorsten Langer et al., "Electrochemical Lithiation of Silicon Clathrate-II", Journal of The Electrochemical Society, 159(8) A1318-A1322 (2012)

SUMMARY OF DISCLOSURE

Technical Problem

A Si particle is high in theoretical capacity and is effective for increasing the energy density of a battery. Meanwhile, the volume of the Si particle varies greatly upon charge and discharge, and the capacity is easily decreased.

The present disclosure has been made in view of the above circumstances, and a main object thereof is to provide a battery with excellent capacity.

Solution to Problem

In order to achieve the object, the present disclosure provides a battery comprising a cathode layer, an electrolyte layer, and an anode layer, in this order, and the anode layer includes a silicon clathrate compound, as an anode active material, the silicon clathrate compound has a composition represented by $M_xSi_{46}$, wherein M is a metal element, x satisfies $0<x<46$, and includes a crystal phase of a Type I silicon clathrate, and an average primary particle size of the silicon clathrate compound is 50 nm or more and 3000 nm or less.

According to the present disclosure, since the anode layer includes the specific silicon clathrate compound as the anode active material, a battery with excellent capacity may be obtained.

In the disclosure, an average secondary particle size of the silicon clathrate compound may be 1 μm or more and 40 μm or less.

In the disclosure, the average primary particle size of the silicon clathrate compound may be 100 nm or more and 1000 nm or less, and the average secondary particle size of the silicon clathrate compound may be 2 μm or more and 20 μm or less.

In the disclosure, the silicon clathrate compound may include the crystal phase of the Type I silicon clathrate as a main phase.

In the disclosure, the silicon clathrate compound may include at least a Na element, as the M.

In the disclosure, the x may satisfy $0<x<8$.

In the disclosure, the electrolyte layer may include an inorganic solid electrolyte.

In the disclosure, the electrolyte layer may include a liquid electrolyte.

In the disclosure, the battery may be a lithium ion battery.

In the disclosure, the battery may be a sodium ion battery.

Advantageous Effects of Disclosure

The battery in the present disclosure exhibits an effect that the capacity thereof is excellent.

DESCRIPTION OF EMBODIMENTS

A battery in the present disclosure will be hereinafter described in details.

Figure 1:
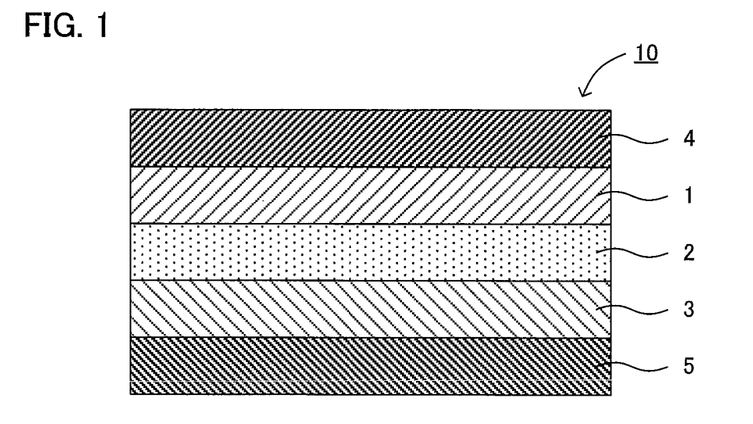
FIG. 1 is a schematic cross-sectional view illustrating an example of a battery in the present disclosure.

FIG. 1 is a schematic cross-sectional view illustrating an example of a battery in the present disclosure. Battery 10 shown in FIG. 1 comprises cathode layer 1, electrolyte layer 2, and anode layer 3, in this order in the thickness direction. Further, battery 10 comprises cathode current collector 4 for collecting currents of cathode layer 1, and anode current collector 5 for collecting currents of anode layer 3. Incidentally, battery 10 may comprise a known outer packing, although not particularly shown in the figure. In the present disclosure, a characteristic is that anode layer 3 includes the specific silicon clathrate compound as the anode active material.

According to the present disclosure, since the anode layer includes the specific silicon clathrate compound as the anode active material, a battery with excellent capacity may be obtained. Particularly, since the average primary particle size of the silicon clathrate compound is in the predetermined range, a battery with excellent capacity may be obtained.

Figure 2A:
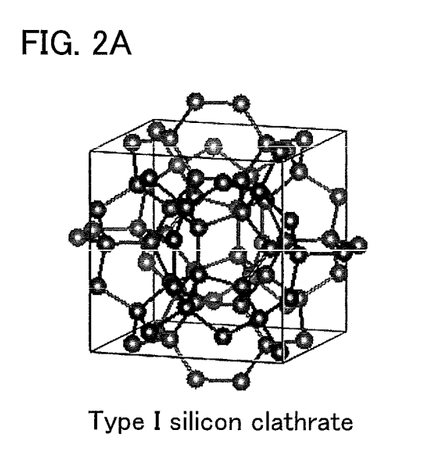
FIGS. 2A and 2B are explanatory drawings illustrating a silicon clathrate compound in the present disclosure.
Figure 2B:
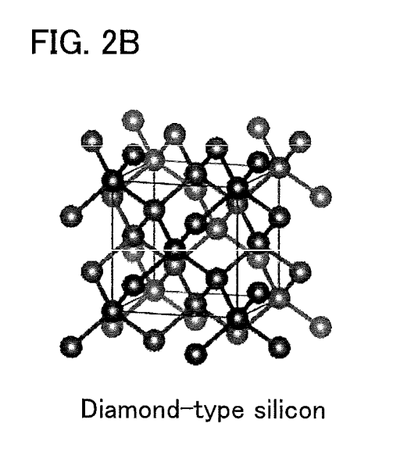

Also, the silicon clathrate compound in the present disclosure includes the crystal phase of a Type I silicon clathrate. In the crystal phase of Type I silicon clathrate, as shown in FIG. 2A, a polyhedron including a pentagon or a hexagon is formed with a plural of Si elements. The polyhedron has a space within thereof that is capable of including a metal ion such as a Li ion. By the metal ion being inserted into this space, the volume variation due to charge/discharge may be suppressed. Also, since the crystal phase of Type I silicon clathrate has the space within thereof that is capable of including the metal ion, there is an advantage that the crystal structure is likely to be maintained although charged/discharged repeatedly. Incidentally, a usual Si particle includes the crystal phase of a diamond-type. In the crystal phase of the diamond-type, as shown in FIG. 2B, a tetrahedron is formed with a plural of Si elements. Since the tetrahedron does not have a space within thereof that is capable of including the metal ion such as a Li ion, the volume variation due to charge/discharge is large.

1. Anode Layer

The anode layer is a layer including at least an anode active material. In the present disclosure, the predetermined silicon clathrate compound is used as the anode active material.

The shape of the silicon clathrate compound is usually a granular shape. The average primary particle size of the silicon clathrate compound is usually 50 nm or more, may be 100 nm or more, and may be 150 nm or more. Meanwhile, the average primary particle size of the silicon clathrate compound is usually 3000 nm or less, may be 1500 nm or less, and may be 1000 nm or less. Also, the average secondary particle size of the silicon clathrate compound is, for example, 1 μm or more, may be 2 μm or more, may be 5 μm or more, and may be 7 μm or more. Meanwhile, the average secondary particle size of the silicon clathrate compound is, for example, 60 μm or less, and may be 40 μm or less. Incidentally, the average primary particle size and the average secondary particle size may be determined by observation with a SEM (scanning electron microscope), for example. The number of the sample is preferably large; for example, 20 or more, may be 50 or more, and may be 100 or more. The average primary particle size and the average secondary particle size may be adjusted appropriately by, for example, appropriately changing the manufacturing conditions of the silicon clathrate compound, and by carrying out a classifying treatment.

The silicon clathrate compound has a composition represented by $M_xSi_{46}$, wherein M is a metal element, x satisfies 0<x<46. Examples of M may include an alkali metal element. Examples of the alkali metal element may include a Li element, a Na element, a K element, a Rb element, and a Cs element. Also, other examples of M may include an alkaline earth metal element. Examples of the alkaline earth metal element may include a Mg element, a Ca element, a Sr element, and a Ba element. Further, other examples of M may include Group 11 elements such as a Cu element, a Ag element, and a Au element; Group 12 elements such as a Zn element; Group 13 elements such as a B element, an Al element, a Ga element, an In element, and a Tl element; Group 14 elements such as a Ge element; Group 15 elements such as a Sb element; Group 16 elements such as a Te element; lanthanoids such as a La element and an Eu element. Also, as M, transition metal elements such as a Ni element may be used.

The silicon clathrate compound preferably includes at least a Na element as M. In this case, the silicon clathrate compound may include only a Na element as M, and may further include another metal element. Also, in the latter case, the proportion of Na element in M may be 50 mol % or more, may be 70 mol % or more, and may be 90 mol % or more.

The x usually satisfies 0<x, and may satisfy 0.1≤x. Meanwhile, the x usually satisfies x<46, may satisfy x≤30, and may satisfy x≤20. Incidentally, in terms of a novel compound, the x may satisfy x<8, may satisfy x≤7.5, and may satisfy x≤6.

The silicon clathrate compound includes the crystal phase of Type I silicon clathrate. Particularly, the silicon clathrate compound preferably includes the crystal phase of Type I silicon clathrate as a main phase. "Including the crystal phase of Type I silicon clathrate as a main phase" means that, among the peaks observed in X-ray diffraction measurement, one of the peak belonging to the crystal phase of Type I silicon clathrate is the peak with the strongest diffraction intensity. The crystal phase of Type I silicon clathrate usually belongs to the space group (Pm-3n). Incidentally, the crystal phase of Type I silicon clathrate includes at least the M element and a Si element.

The crystal phase of the Type I silicon clathrate has a typical peak at a position of 2θ=19.44°, 21.32°, 30.33°, 31.60°, 32.82°, 36.29°, 52.39°, and 55.49° in X-ray diffraction measurement using a CuKα ray. These peak positions may vary respectively in a range of ±1.00°, may vary in a range of ±0.50°, and may vary in a range of ±0.300. Incidentally, when the metal ion such as a lithium ion is inserted into the crystal phase of Type I silicon clathrate, for example, the peak may be shifted in some cases. Therefore, the XRD measurement is preferably carried out in the state that the metal ion is not inserted.

Also, the silicon clathrate compound preferably includes no Si crystal phase of a diamond-type, but may include slightly. The Si crystal phase of the diamond-type has a typical peak at a position of 2θ=28.44°, 47.31°, 56.10°, 69.17°, and 76.37° in X-ray diffraction measurement using a CuKα ray. These peak positions may vary respectively in a range of ±1.00°, may vary in a range of ±0.50°, and may vary in a range of ±0.30°

Here, the diffraction intensity of the peak at 2θ=32.82°±1.00° in the crystal phase of Type I silicon clathrate is regarded as $I_A$, and a diffraction intensity of the peak at 2θ=28.44°±1.00° in the Si crystal phase of the diamond-type is regarded as $I_B$. The proportion of $I_B$ to $I_A$ ($I_B/I_A$) is preferably small. The value of $I_B/I_A$ is, for example, 0.3 or less, may be 0.2 or less, may be 0.1 or less, may be 0.08 or less, and may be 0.06 or less. Meanwhile the value of $I_B/I_A$ may be 0, and may be more than 0.

Also, the silicon clathrate compound preferably includes no crystal phase of Type II silicon clathrate, but may include slightly. The crystal phase of Type II silicon clathrate usually belongs to the space group (Fd-3m). The crystal phase of Type II silicon clathrate has a typical peak at a position of 2θ=20.09°, 21.00°, 26.51°, 31.72°, 36.26°, and 53.01° in X-ray diffraction measurement using a CuKα ray. These peak positions may vary respectively in a range of ±1.00°, may vary in a range of ±0.50°, and may vary in a range of ±0.300.

Here, the diffraction intensity of the peak at 2θ=26.51°±1.00° in the crystal phase of Type II silicon clathrate is regarded as $I_C$. The proportion of $I_C$ to $I_A$ ($I_C/I_A$) is preferably small. The value of $I_C/I_A$ is, for example, 1 or less, may be 0.8 or less, may be 0.6 or less, may be 0.4 or less, may be 0.2 or less, and may be 0.1 or less. Meanwhile the value of $I_C/I_A$ may be 0, and may be more than 0.

Also, the silicon clathrate compound preferably includes no Zintl phase, but may include slightly. The Zintl phase has a typical peak at a position of 2θ=16.10°, 16.56°, 17.64°, 20.16°, 27.96°, 33.60°, 35.68°, 40.22°, and 41.14° in X-ray diffraction measurement using a CuKα ray. These peak positions may vary respectively in a range of ±1.00°, may vary in a range of +0.50°, and may vary in a range of ±0.300.

Here, the diffraction intensity of the peak at 2θ=33.60°±1.000 in the Zintl phase is regarded as $I_D$. The proportion of $I_D$ to $I_4$ ($I_D/I_4$) is preferably small. The value of $I_D/I_4$ is, for example, 0.5 or less, may be 0.25 or less, may be 0.1 or less, and may be 0.05 or less. Meanwhile the value of $I_D/I_4$ may be 0, and may be more than 0.

The method for producing the silicon clathrate compound is not particularly limited, and examples may include a method including a first heat treatment step of synthesizing MSi compound by carrying out a heat treatment to a mixture including a Si particle and a simple substance of a metal element M (M simple substance), and a second heat treatment step of desorbing M by carrying out a heat treatment to the MSi compound under reduced pressure.

The proportion of the Si particle and the M simple substance in the first heat treatment step is not particularly limited, and to 1 part by mole of the Si particle, the M simple substance is, for example, 0.8 parts by mole or more, may be 1 part by mole or more, and may be 1.1 parts by mole or more. Meanwhile, to 1 part by mole of the Si particle, the M simple substance is, for example, 1.5 parts by mole or less, may be 1.3 parts by mole or less, and may be 1.2 parts by mole or less.

The heat treatment temperature in the first heat treatment step is, for example, 500° C. or more, and 1000° C. or less. Also, the heat treatment time in the first heat treatment step is, for example, 1 hour or more, and 50 hours or less.

In the second heat treatment step, the pressure upon the heat treatment is, for example, 10 Pa or less, may be 1 Pa or less, and may be 0.1 Pa or less. Also, the heat treatment temperature in the second heat treatment step is, for example, 100° C. or more, and 650° C. or less. Also, the heat treatment time in the second heat treatment step is, for example, 30 minutes or more, and 20 hours or less. The silicon clathrate compound may be obtained in the second heat treatment step.

The anode layer may include only the above described active material (silicon clathrate compound) as the anode active material, and may include another active material. In the latter case, the proportion of the silicon clathrate compound in the total anode active material is, for example, 50% by weight or more, may be 70% by weight or more, and may be 90% by weight or more.

The proportion of the anode active material in the anode layer is, for example, 20% by weight or more, may be 30% by weight or more, and may be 40% by weight or more. Meanwhile, the proportion of the anode active material is, for example, 80% by weight or less, may be 70% by weight or less, and may be 60% by weight or less.

Also, the anode layer may include at least one of an electrolyte, a conductive material, and a binder as required. The electrolyte will be described in detail in "3. Electrolyte layer" later.

Examples of the conductive material may include a carbon material, a metal particle, and a conductive polymer. Examples of the carbon material may include particulate carbon materials such as acetylene black (AB) and Ketjen black (KB); and fibrous carbon materials such as carbon fiber, carbon nanotube (CNT), and carbon nanofiber (CNF). Examples of the metal particle may include particles such as Ni, Cu, Fe and SUS. Examples of the conductive polymer may include polyacetylene based polymers such as polyacetylene; polyaniline based polymers such as polyaniline; polypyrrole based polymers such as copolymer of 3-methyl-4-pyrrolecarboxylic acid ethyl ester and 3-methyl-4-pyrrolecarboxylic acid butyl ester; polythiophene based polymers such as PEDOT obtained by polymerizing 3, 4-ethylenedioxythiophene; polyphenylene based polymers such as polyp-phenylene; polyphenylene vinylene based polymers such as poly p-phenylene vinylene; polyacene based polymers such as polyacene; and polyazulene based polymers such as polyazulene.

Examples of the binder may include rubber-based binders such as butadiene rubber, butadiene hydrorubber, styrene butadiene rubber (SBR), styrene butadiene hydrorubber, nitrile-butadiene rubber, nitrile-butadiene hydrorubber, and ethylene-propylene rubber; fluorine-based binders such as polyvinylidene fluoride (PVDF), polyvinylidene fluoride-polyhexafluoropropylene copolymer (PVDF-HFP), polytetrafluoroethylene, and fluororubber. Also, other examples of the binder may include polyolefin based thermoplastic resins such as polyethylene, polypropylene, and polystyrene; imide based resins such as polyimide and polyamide-imide; amide based resins such as polyamide; acrylate resins such as polymethyl acrylate, polyethyl acrylate, polypropyl acrylate, polybutyl acrylate, polyhexyl acrylate, poly2-ethylhexyl acrylate, polydecyl acrylate, and polyacrylic acid; methacrylate resins such as polymethyl methacrylate, polyethyl methacrylate, polybutyl methacrylate, poly2-ethylhexyl methacrylate, and polymethacrylic acid; polycarboxylic acid such as polyitaconic acid, polycrotonic acid, polyfumaric acid, polyangelic acid, and carboxymethyl cellulose.

Also, other examples of the binder may include polyethylene oxide, polypropylene oxide, polyacrylonitrile, polyethylene glycol dimethacrylate, polyethylene glycol acrylate, polyethylene vinyl acetate, polyglycidol, polysiloxane, polydimethylsiloxane, polyvinyl acetate, polyvinyl alcohol, polycarbonate, polyamine, polyalkyl carbonate, polynitrile, polydiene, polyphosphazene, unsaturated polyesters obtained by copolymerizing maleic anhydride and glycols, and polyethylene oxide derivatives with a substituent group. Also, a copolymer obtained by copolymerizing two kinds or more monomers constituting the polymers specifically described above may be selected as the binder. Also, polysaccharides such as glycogen, cellulose, chitin, agarose, carrageenan, heparin, hyaluronan, pectin, amylopectin, xyloglucan, and amylose may be used as the binder. Also, these binders may also be used as a dispersion fluid such as an emulsion.

The thickness of the anode layer is, for example, 0.1 μm or more and 1000 μm or less.

2. Cathode Layer

The cathode layer is a layer containing at least a cathode active material. Also, the cathode layer may contain at least one of an electrolyte, a conductive material, and a binder, as necessary.

Examples of the cathode active material may include an oxide active material. Examples of the oxide active material used for a lithium ion battery may include rock salt bed type active materials such as $LiCoO_2$, $LiMnO_2$, $LiNiO_2$, $LiVO_2$, $LiNi_{1/3}Co_{1/3}Mn_{1/3}O_2$, $LiNi_{0.8}Co_{0.15}Al_{0.05}O_2$, $LiNi_{0.5}Mn_{0.5}O_2$, $LiNi_{0.33}Mn_{0.67}O_2$, $LiNi_{0.8}Co_{0.1}Mn_{0.1}O_2$, $LiNi_{0.6}Co_{0.2}Mn_{0.2}O_2$, $LiNi_{0.5}Co_{0.2}Mn_{0.3}O_2$; active materials having Li excess composition and utilizing oxygen redox partially in charge/discharge such as $Li_2MnO_3$, $Li_{1.2}Mn_{0.54}Co_{0.13}Ni_{0.13}O_2$, $Li_{1.3}Nb_{0.3}Mn_{0.4}O_2$, $Li_{1.2}Ti_{0.4}Mn_{0.4}O_2$, and $Li_{1.3}Nb_{0.3}Fe_{0.4}O_2$; spinel type active materials such as $LiMn_2O_4$, $Li_4Ti_5O_{12}$, and $Li(Ni_{0.5}Mn_{1.5})O_4$; olivine type active materials such as $LiFePO_4$, $LiMnPO_4$, $LiNiPO_4$, and $LiCoPO_4$; nasicon type active materials such as $Li_3V_2(PO_4)_3$; silicate type active materials such as $Li_2FeSiO_4$; pyrochlore type active materials such as $LiFeP_2O_7$. Also, as the oxide active material, $LiVPO_4F$ and $LiFeSO_4F$ may be used.

Also, a coating layer including a Li ion conductive oxide may be formed on the surface of the oxide active material. The reason therefor is to inhibit the reaction of the oxide active material with the solid electrolyte (particularly sulfide solid electrolyte). Examples of the Li ion conductive oxide may include lithium niobates such as $LiNbO_3$; lithium titanates such as $Li_4Ti_5O_{12}$; lithium tungstates such as $LiWO_3$; lithium tantalites such as $LiTaO_3$; lithium molybdates such as $LiMoO_3$; and lithium phosphates such as $Li_3PO_4$. Further, the later described oxide solid electrolyte may be used as the Li ion conductive oxide. The thickness of the coating layer is, for example, 1 nm or more. Meanwhile, the thickness of the coating layer is, for example, 30 nm or less, and may be 15 nm or less.

Meanwhile, examples of the oxide active material used for a sodium ion battery may include an $O_3$ type layered active material, a $P_2$ type layered active material, a $P_3$ type layered active material, and alluaudite type active material. Specific examples of such oxide active materials may include $NaFeO_2$, $NaNiO_2$, $NaCoO_2$, $NaMnO_2$, $NaVO_2$, $Na(Ni_XMn_{1-X})O_2$ (0<X<1), $Na(Fe_XMn_{1-X})O_2$ (0<X<1), $Na(Ni_XCo_YMn_{1-X-Y})O_2$ (0<X<1, 0<Y<1), $Na_zFeO_2$ (0.6<z<1), $Na_zNiO_2$ (0.6<z<1), $Na_zCoO_2$ (0.6<z<1), $Na_zMnO_2$ (0.6<z<1), $Na_zVO_2$ (0.6<z<1), $Na_z(Ni_XMn_{1-X})O_2$ (0<X<1, 0.6<z<1), $Na_z(Fe_XMn_{1-X})O_2$, (0<X<1, 0.6<z<1), $Na_z(Ni_XCo_YMn_{1-X-Y})O_2$ (0<X<1, 0<Y<1, 0.6<z<1), $NaFeO_2$, $NaNiO_2$, $NaCoO_2$, $NaMnO_2$, $NaVO_2$, $Na(Ni_XMn_{1-X})O_2$ (0<X<1), $Na(Fe_XMn_{1-X})O_2$ (0<X<1), $Na(Ni_XCo_YMn_{1-X-Y})O_2$ (0<X<1, 0<Y<1), $Na_2Fe_2(SO_4)_3$, $NaVPO_4F$, $Na_2FePO_4F$, $Na_3V_2(PO_4)3$, $Na_4M_3((PO_4)_2P_2O_7$ (M is at least one kind of Co, Ni, Fe, and Mn).

Examples of the shape of the cathode active material may include a granular shape. The average particle size ($D_{50}$) of the cathode active material is not particularly limited; is, for example, 10 nm or more, and may be 100 nm or more. Meanwhile, the average particle size ($D_{50}$) of the cathode active material is, for example, 50 μm or less, and may be 20 μm or less. Incidentally, the average particle size ($D_{50}$) may be calculated from the measurement by, for example, a laser diffraction type particle size distribution meter, and a scanning electron microscope (SEM).

The proportion of the cathode active material in the cathode layer is, for example, 20% by weight or more, may be 30% by weight or more, and may be 40% by weight or more. Meanwhile, the proportion of the cathode active material is, for example, 80% by weight or less, may be 70% by weight or less, and may be 60% by weight or less.

The conductive material and the binder used for the cathode layer may be in the same contents as those described in "1. Anode layer" above; thus, the description herein is omitted. Meanwhile, the electrolyte used for the cathode layer will be described in detail in "3. Electrolyte layer" later.

The thickness of the cathode layer is, for example, 0.1 μm or more and 1000 μm or less.

3. Electrolyte Layer

The electrolyte layer is a layer formed between the cathode layer and the anode layer, and includes at least an electrolyte. The electrolyte may be a solid electrolyte, may be an electrolyte solution (liquid electrolyte), and may be a mixture thereof. The kind of the electrolyte is not particularly limited, and may be appropriately selected according to the kind of the battery.

Typical examples of the solid electrolyte may include inorganic solid electrolytes such as sulfide solid electrolyte, oxide solid electrolyte, nitride solid electrolyte, and halide solid electrolyte; and organic polymer electrolytes such as polymer electrolyte.

Examples of the sulfide solid electrolyte having lithium ion conductivity may include solid electrolyte including a Li element, an X element (X is at least one kind of P, As, Sb, Si, Ge, Sn, B, Al, Ga, and In) and a S element. Also, the sulfide solid electrolyte may further include at least either one of an O element and a halogen element. Examples of the halogen element may include a F element, a Cl element, a Br element, and an I element.

The sulfide solid electrolyte may be a glass based sulfide solid electrolyte, may be a glass ceramic based sulfide solid electrolyte, and may be a crystalline sulfide solid electrolyte.

The glass based sulfide solid electrolyte is preferably provided with an ion conductor including a Li element, an A element (A is at least one kind of P, As, Sb, Si, Ge, Al, and B) and a S element. Further, the ion conductor is preferably high in Li content. Also, the ion conductor preferably has an anion structure of an ortho composition ($PS_4^{3-}$ structure, $SiS_4^{4-}$ structure, $GeS_4^{4-}$ structure, $AlS_3^{3-}$ structure, and $BS_3^{3-}$ structure) as the main component of the anion. The reason therefor is to allow the ion conductor to have high chemical stability. The proportion of the anion structure of an ortho composition with respect to all the anion structures in the ion conductor is, preferably 70 mol % or more, and more preferably 90 mol % or more. The proportion of the anion structure of an ortho composition may be determined by methods such as a Raman spectroscopy, NMR, and XPS.

The glass based sulfide solid electrolyte may contain lithium halide in addition to the ion conductor. Examples of the lithium halide may include LiF, LiCl, LiBr, and LiI; among them, LiCl, LiBr, and LiI are preferable. The proportion of LiX (X=F, I, Cl, and Br) in the glass based sulfide solid electrolyte is, for example, 5 mol % or more, and may be 15 mol % or more. Meanwhile, the proportion of the LiX is, for example, and 30 mol % or less, and may be 25 mol % or less.

The glass ceramic based sulfide solid electrolyte may be obtained by, for example, carrying out a heat treatment to the above described glass based sulfide solid electrolyte. Specific examples of the glass ceramic based sulfide solid electrolyte may include $xLi_2S·(100-x)P_2S_5$ (70≤x≤80), $yLiI·zLiBr·(100-y-z)$ ($xLi_2S·(100-x)P_2S_5$) (70≤x≤80), 0≤y≤30, 0≤z≤30).

Examples of the crystalline sulfide solid electrolyte may include thio-LISICON type solid electrolyte, LGPS type solid electrolyte, and argyrodite type solid electrolyte. Examples of the thio-LISICON type solid electrolyte may include $Li_{(4-x)}Ge_{(1-x)}P_xP_4$ (x satisfies 0<x<1). Also, examples of the LGPS type solid electrolyte may include $Li_{(4-x)}Ge_{(1-x)}P_xS_4$ (x satisfies 0<x<1). Incidentally, Sb, Si, Sn, B, Al, Ga, In, Ti, Zr, V, and Nb may be used instead of at least either one of Ge and P. Also, a part of Li may be substituted with Na, K, Mg, Ca, and Zn. Further, a part of S may be substituted with a halogen (F, Cl, Br, and I). Examples of the argyrodite type solid electrolyte may include $Li_{7-x-2y}PS_{6-x-y}X_y$, $Li_{8-x-2y}SiS_{6-x-y}X_y$, and $Li_{8-x-2y}GeS_{6-x-y}X_y$. Incidentally, X is at least one kind of F, Cl, Br, and I, and x and y respectively satisfies 0≤x, 0≤y.

Also, examples of the oxide solid electrolyte having lithium ion conductivity may include solid electrolytes containing a Li element, a Y element (Y is at least one kind of Nb, B, Al, Si, P, Ti, Zr, Mo, W and S), and an O element. Specific examples may include garnet type solid electrolytes such as $Li_7La_3Zr_2O_{12}$, $Li_{7-x}La_3(Zr_{2-x}Nb_x)O_{12}$, (0≤x≤2), $Li_5La_3Nb_2O_{12}$; perovskite type solid electrolyte such as (Li, La)$TiO_3$, (Li, La)$NbO_3$, (Li, Sr) (Ta, Zr)$O_3$; nasicon type solid electrolytes such as Li(Al, Ti)$(PO_4)_3$, Li(Al, Ga)$(PO_4)_3$; Li—P—O type solid electrolytes such as $Li_3PO_4$, LIPON (a compound obtained by substituting a part of O of $Li_3PO_4$ with N); Li—B—O type solid electrolytes such as $Li_3BO_3$, and a compound obtained by substituting a part of O of $Li_3BO_3$ with C.

Meanwhile, examples of the oxide solid electrolyte having sodium ion conductivity may include nasicon type solid electrolyte, perovskite type solid electrolyte, and β alumina. Also, examples of the nitride solid electrolyte having lithium ion conductivity may include $Li_3N$. Examples of the halide solid electrolyte having lithium ion conductivity may include LiCl, LiI, LiBr, and $Li_3YCl_6$.

Also, the polymer electrolyte preferably includes an ion conductive unit. Examples of the ion conductive unit may include polyethylene oxide, polypropylene oxide, polymethacrylic acid ester, polyacrylic acid ester, polydimethylsiloxane, polyacrylic acid, polymethacrylic acid, polyethylene vinyl acetate, polyimide, polyamine, polyamide, polyalkyl carbonate, polynitrile, polyphosphazene, polyolefin, and polydiene. The polymer electrolyte may include one kind or two kinds or more of the ion conductive unit. Also, the polymer electrolyte preferably includes the later described supporting salt. Also, a plastic crystal may be used as the polymer electrolyte.

Meanwhile, the liquid electrolyte preferably includes a supporting salt and a solvent. Incidentally, an ionic liquid may be used as the liquid electrolyte. Examples of the supporting salt (lithium salt) of the liquid electrolyte having lithium ion conductivity may include inorganic lithium salts such as $LiPF_6$, $LiBF_4$, $LiClO_4$, and $LiAsF_6$; and organic lithium salts such as $LiCF_3SO_3$, $LiN(CF_3SO_2)_2$, $LiN(C_2F_5SO_2)_2$, $LiN(FSO_2)_2$, and $LiC(CF_3SO_2)_3$. Meanwhile, examples of the supporting salt (sodium salt) of the liquid electrolyte having sodium ion conductivity may include inorganic sodium salts such as $NaPF_6$, $NaBF_4$, $NaClO_4$, and $NaAsF_6$; and organic sodium salts such as $NaCF_3SO_3$, $NaN(CF_3SO_2)_2$, $NaN(C_2F_5SO_2)_2$, $NaN(FSO_2)_2$, and $NaC(CF_3SO_2)_3$.

The solvent used for the liquid electrolyte is not particularly limited, and is preferably a mixed solvent including a high-permittivity solvent and a low-viscosity solvent. Examples of the high-permittivity solvent may include cyclic esters (cyclic carbonates) such as ethylene carbonate (EC), propylene carbonate (PC), and butylene carbonate (BC), γ-butyrolactone, sulfolane, N-methylpyrrolidone (NMP), and 1, 3-dimethyl-2-imidazolidinone (DMI). Meanwhile, examples of the low-viscosity solvent may include chain esters (chain carbonates) such as dimethyl carbonate (DMC), diethyl carbonate (DEC), and ethylmethyl carbonate (EMC); acetates such as methyl acetate, and ethyl acetate; and ethers such as 2-methyltetrahydrofuran. Incidentally, the solvent used for the liquid electrolyte may be a non-aqueous solvent, and may be an aqueous solvent.

Also, the ionic liquid may be used as the liquid electrolyte or the solvent. The ionic liquid includes a cation part and an anion part. Examples of the cation part may include an organonitrogen based (such as imidazolium salt, ammonium salt, pyridinium salt and piperidinium salt), organophosphorous based (such as phosphonium salt), and organosulfur based (such as sulfonium salt). Meanwhile, examples of the anion part may include $AlCl_4^-$, $NO_2^-$, $NO_3^-$, $I^-$, $BF_4^-$, $PF_6^-$, $SbF_6^-$, $NbF_6^-$, $F(HF)_{2.3}^-$, $CH_3CO_2^-$, $CH_3SO_3^-$, $CF_3SO_3^-$ $(CF_3SO_2)_2N^-$, and $(FSO_2)_2N^-$.

Also, a solvated ionic liquid may be used as the liquid electrolyte. The solvated ionic liquid may be obtained by, for example, mixing glymes such as tetraglyme and triglyme with the above described supporting salt. The proportion of the glymes and the supporting salt is preferably, for example, approximately 1:1 in molar ratio.

The concentration of the supporting salt in the liquid electrolyte is, for example, 0.3 mol/l or more, may be 0.5 mol/l or more, and may be 0.8 mol/l or more. Meanwhile, the concentration of the supporting salt in the liquid electrolyte is, for example, 6 mol/l or less, and may be 3 mol/l or less. Also, in the present disclosure, the liquid electrolyte may be turned into a gel by adding a polymer. Examples of the polymer may include polyethylene oxide (PEO), polyacrylonitrile (PAN) or polymethylmethacrylate (PMMA), and polyvinylidene fluoride-hexafluoropropylene (PVDF-HFP).

Also, the electrolyte layer may include a separator. The material of the separator may be an organic material, and may be an inorganic material. Specific examples may include porous films such as polyethylene (PE), polypropylene (PP), cellulose, polyvinylidene fluoride, polyamide, and polyimide; nonwoven fabrics such as resin nonwoven fabric, and glass fiber nonwoven fabric; and ceramic porous films. Also, the separator may be a single layer structure, and may be a stacked structure.

The thickness of the electrolyte layer is, for example, 0.1 μm or more and 100 μm or less. Incidentally the electrolyte layer may include filler such as an inorganic particle and an organic particle.

4. Other Constitutions

The battery in the present disclosure comprises at least the above described anode layer, cathode layer, and electrolyte layer. Further, the battery in the present disclosure usually comprises a cathode current collector for collecting currents of the cathode layer and an anode current collector for collecting currents of the anode layer. Examples of the materials for the cathode current collector may include SUS, aluminum, nickel, iron, titanium, and carbon. Meanwhile, examples of the materials for the anode current collector may include SUS, copper, nickel, and carbon. Incidentally, the thickness and the shape of the cathode current collector and the anode current collector are preferably appropriately selected according to the use of the battery. Also, the cathode current collector and the anode current collector may respectively include a protecting layer on the electrolyte layer side surface. Examples of the protecting layer may include a carbon coating layer, a resin coating layer, and a metallic plating layer.

Also, the battery in the present disclosure may further include a confining jig that applies a confining pressure along the thickness direction, to the cathode layer, the electrolyte layer and the anode layer. A known jig may be used as the confining jig. The confining pressure is, for example, 0.1 MPa or more, may be 1 MPa or more, and may be 5 MPa or more. Meanwhile, the confining pressure is, for example, 100 MPa or less, may be 50 MPa or less, and may be 20 MPa or less.

5. Battery

The battery in the present disclosure is usually a battery in which a metallic ion conducts between the cathode layer and the anode layer. Examples of such batteries may include a lithium ion battery, a sodium ion battery, a potassium ion battery, a magnesium ion battery, and a calcium ion battery. Also, the battery in the present disclosure may be a liquid battery in which the electrolyte layer includes a liquid electrolyte, and may be an all solid state battery in which the electrolyte layer includes a solid electrolyte.

Also, the battery in the present disclosure may be a primary battery and may be a secondary battery; above all, preferably the secondary battery so as to be repeatedly charged and discharged, and be useful as a car-mounted battery, for example. The secondary battery includes the use of a secondary battery as a primary battery (use for the purpose of the first charge only).

Also, the battery in the present disclosure may be a single cell battery and may be a stacked battery. The stacked battery may be a monopolar type stacked battery (a stacked battery connected in parallel), and may be a bipolar type stacked battery (a stacked battery connected in series). Examples of the shape of the battery may include a coin shape, a laminate shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

Synthesis of Anode Active Material

Figure 3:
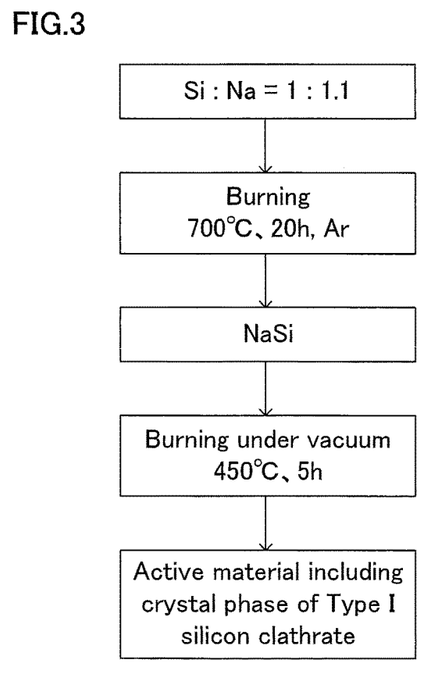
FIG. 3 is a flow diagram illustrating an example of a method for producing a silicon clathrate compound in the present disclosure.

An anode active material was synthesized according to the flow shown in FIG. 3. Si particles (of the purity of 99.999%) and metallic Na (of the purity of 99.5%) were weighed so as to be Si particle:metallic Na=1:1.1 in the molar ratio, added to a crucible made of boron nitride, and sealed under Ar atmosphere. After that, a heat treatment was carried out under the following conditions; 700° C. for 20 hours. Thereby, NaSi compound (compound having Zintl phase) was obtained. The obtained NaSi compound was crushed and mixed, and a heat treatment was carried out under the following conditions; 450° C. for 5 hours under vacuum (approximately 0.1 Pa) so as to desorb Na. The obtained compound was crushed and mixed in a mortar. After that, the particle size was adjusted by classification, and anode active material particles (average primary particle size=50 nm and average secondary particle size=2 μm) were obtained.

Production of Evaluation Battery 0.4 g of solid electrolyte particles ($Li_3PS_4$), 0.8 g of the obtained anode active material particles, 0.06 g of a conductive material (VGCF), and 0.32 g of a binder solution (a butyl butyrate solution containing a PVDF-based resin of 5% by weight) were added to a container made of polypropylene. An ultrasonic treatment was carried out to the container by an ultrasonic dispersion apparatus for 30 seconds, a shaking treatment was carried out by using a shaker for 30 minutes, and slurry was obtained. The obtained slurry was pasted on an anode current collector (a Cu foil) by a blade method using an applicator, dried naturally for 60 minutes, and then, dried for 30 minutes on a hot plate adjusted to be 100° C. An anode structure including an anode layer and an anode current collector was obtained in the above manner.

Next, 0.3 g of solid electrolyte particles ($Li_3PS_4$), 2 g of cathode active material particles ($LiNi_{1/3}Co_{1/3}Mn_{1/3}O_2$) 0.03 g of a conductive material (VGCF), and 0.3 g of a binder solution (a butyl butyrate solution containing a PVDF-based resin of 5% by weight) were added to a container made of polypropylene. An ultrasonic treatment was carried out to the container by an ultrasonic dispersion apparatus for 30 seconds, a shaking treatment was carried out by using a shaker for 30 minutes, and slurry was obtained. The obtained slurry was pasted on a cathode current collector (an aluminum foil) by a blade method using an applicator, dried naturally for 60 minutes, and then, dried for 30 minutes on a hot plate adjusted to be 100° C. A cathode structure including a cathode layer and a cathode current collector was obtained in the above manner.

Next, 0.4 g of solid electrolyte particles ($Li_3PS_4$, average particle size $D_{50}$=2 μm), 0.05 g of a binder solution (a heptane solution containing an ABR based resin of 5% by weight) were added to a container made of polypropylene. An ultrasonic treatment was carried out to the container by an ultrasonic dispersion apparatus for 30 seconds, a shaking treatment was carried out by using a shaker for 30 minutes, and slurry was obtained. The obtained slurry was pasted on a support (an aluminum foil) by a blade method using an applicator, dried naturally for 60 minutes, and then, dried for 30 minutes on a hot plate adjusted to be 100° C. A solid electrolyte layer was formed in the above manner.

Next, the anode structure, the solid electrolyte layer, and the cathode structure were stacked in this order, the obtained stack was pressed under the following conditions; 130° C. and 200 MPa for 3 minutes, and an evaluation battery was obtained.

Examples 2 to 5 and Comparative Example 1

An evaluation battery was obtained in the same manner as in Example 1, except that the average primary particle size of the anode active material particle was changed to 100 nm, 200 nm, 1000 nm, and 3000 nm respectively (Examples 2 to 5). Meanwhile, an evaluation battery was obtained in the same manner as in Example 1, except that the average primary particle size of the anode active material particle was changed to 10000 nm (Comparative Example 1).

[Evaluation]

XRD Measurement

Figure 4:
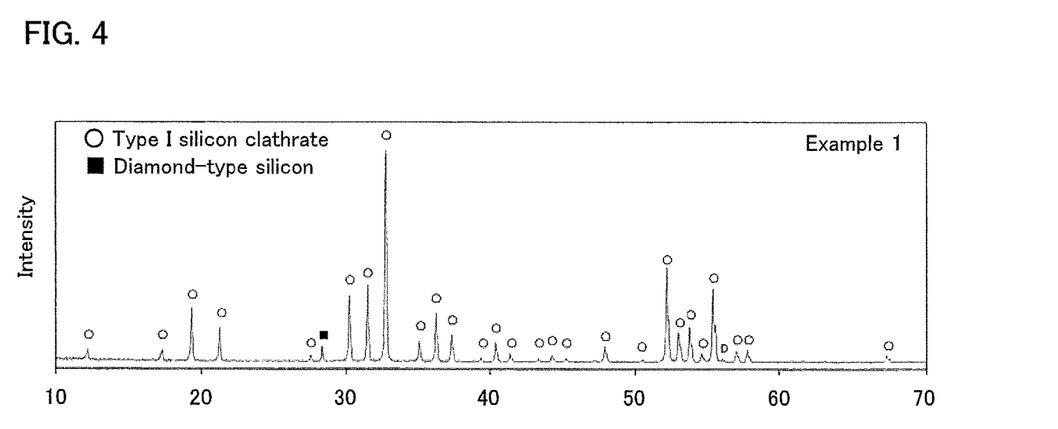
FIG. 4 is the result of an XRD measurement for the anode active material obtained in Example 1.

An X-ray diffraction (XRD) measurement using a CuKα ray was carried out for the anode active material obtained in Example 1. The result thereof is shown in FIG. 4. As shown in FIG. 4, typical peaks of the crystal phase of Type I silicon clathrate were confirmed in Example 1 at positions of 2θ=19.440, 21.32°, 30.33°, 31.60°, 32.82°, 36.29°, 52.39°, and 55.49°

Also, as shown in FIG. 4, a peak of the Si crystal phase of the diamond-type was slightly confirmed in Example 1 at position of 2θ=28.440. When the diffraction intensity of the peak at 2θ=32.82° in the crystal phase of Type I silicon clathrate is regarded as $I_A$, and the diffraction intensity of the peak at 2θ=28.44° in the Si crystal phase of the diamond-type is regarded as $I_B$, $I_B/I_A$ was 0.08.

SEM Measurement

Figure 5:
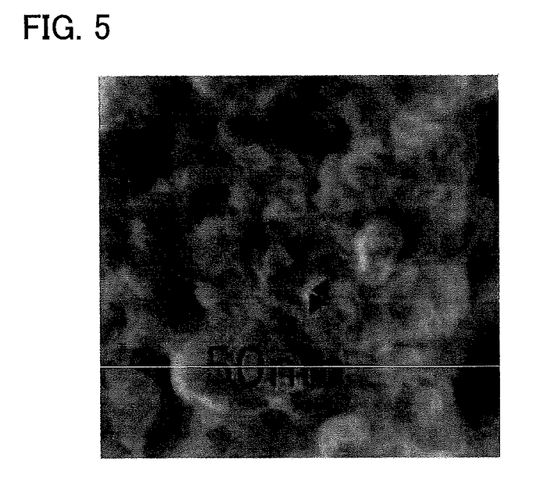
FIG. 5 is the result of an SEM measurement for the anode active material obtained in Example 1.

A SEM (scanning electron microscope) observation was carried out for each anode active material obtained in Examples 1 to 5 and Comparative Example 1. The result of Example 1 is shown in FIG. 5 as a representative result. As shown in FIG. 5, it was confirmed that the anode active material obtained in Example 1 has a secondary particle structure formed by the agglutinated primary particles. Also, SEM-EDX (scanning electron microscope-energy dispersion type X-ray spectroscope) measurement was carried out for the anode active material obtained in Example 1 so as to measure Na/Si. As the result, Na/Si was 0.1. That is, it was confirmed that the anode active material obtained in Example 1 has the composition represented by $Na_{4.6}Si_{46}$.

Charge and Discharge Test

A charge and discharge test was carried out for each evaluation battery obtained in Examples 1 to 5 and Comparative Example 1. The conditions for the charge and discharge test were: confining pressure of 5 MPa, charging at 0.1 C, discharging at 1 C, and cutoff voltage of 3.0 V to 4.55 V, thus, the first time discharging capacity was determined. The results are shown in FIG. 6 and Table 1.

TABLE 1

|  | Average primary particle size [nm] | First time discharging capacity [mAh/g] |
| --- | --- | --- |
| Example 1 | 50 | 183 |
| Example 2 | 100 | 189 |
| Example 3 | 200 | 192 |
| Example 4 | 1000 | 186 |
| Example 5 | 3000 | 185 |
| Comp. Ex. 1 | 10000 | 170 |

Figure 6:
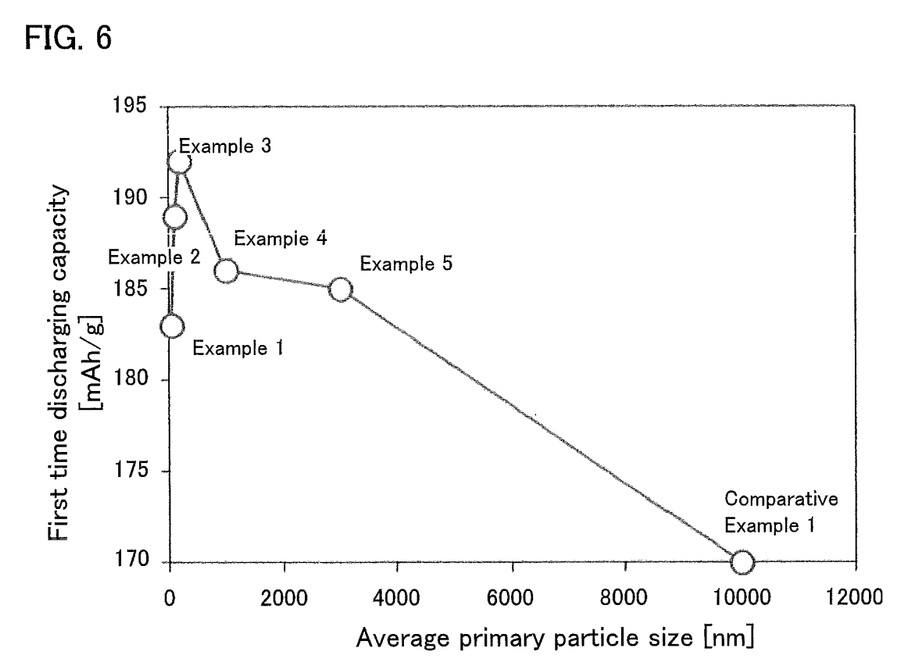
FIG. 6 is the results of a charge/discharge test for the evaluation batteries obtained in Examples 1 to 5 and Comparative Example 1.

As shown in FIG. 6 and Table 1, excellent capacity was confirmed in Examples 1 to 5, compared to Comparative Example 1. Also, comparing to Example 2, the capacity was slightly decreased in Example 1. The reason therefor is assumed as follows; since the specific surface area of the anode active material was increased, excellent interface between the anode active material and the solid electrolyte has become difficult to be formed. Particularly, it is presumed that, since the C rate during the discharge was relatively high, the state of the interface between the anode active material and the solid electrolyte has become a great cause of the resistance increase, and as the result, the capacity was decreased. Meanwhile, comparing to Example 5, the capacity was greatly decreased in Comparative Example 1. The reason therefor is assumed as follows; the decrease of Li diffuseness within the anode active material (Li diffuseness within bulk) has become a great cause of the resistance increase, and as the result, the capacity was decreased.

Examples 6 to 9

An evaluation battery was obtained in the same manner as in Example 1, except that the average primary particle size of the anode active material particle was changed to 200 nm, and the average secondary particle size was changed to the value shown in Table 2 respectively.

[Evaluation]

A charge and discharge test was carried out for each evaluation battery obtained in Examples 6 to 9. The conditions for the charge and discharge test were: confining pressure of 5 MPa, charging at 0.1 C, discharging at 1 C, and cutoff voltage of 3.0 V to 4.55 V, thus, the first time discharging capacity was determined. The results are shown in FIG. 7 and Table 2.

TABLE 2

|  | Average secondary particle size [μm] | First time discharging capacity [mAh/g] |
| --- | --- | --- |
| Example 6 | 1 | 190 |
| Example 7 | 10 | 192 |
| Example 8 | 20 | 185 |
| Example 9 | 40 | 180 |

Figure 7:
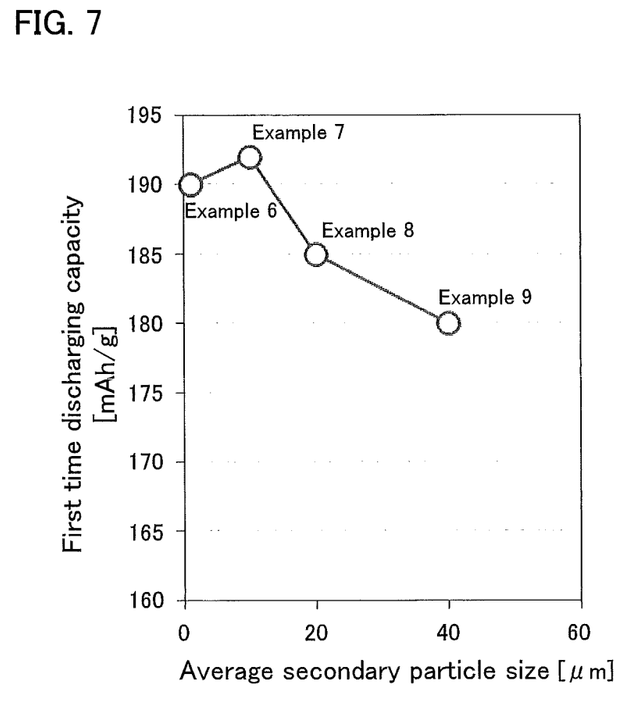
FIG. 7 is the results of a charge/discharge test for the evaluation batteries obtained in Examples 6 to 9.

As shown in FIG. 7 and Table 2, excellent capacity was confirmed totally, when the average secondary particle size was 1 μm or more and 40 μm or less.

REFERENCE SIGNS LIST

1 cathode layer
2 electrolyte layer
3 anode layer
4 cathode current collector
5 anode current collector
10 battery

The invention claimed is:

1. A battery comprising a cathode layer, an electrolyte layer, and an anode layer, in this order, and
   the anode layer includes a silicon clathrate compound, as an anode active material,
   the silicon clathrate compound has a composition represented by $M_xSi_{46}$, wherein M is a metal element, x satisfies 0<x<8, and includes a crystal phase of a Type I silicon clathrate,
   an average primary particle size of the silicon clathrate compound is 50 nm or more and 3000 nm or less,
   the silicon clathrate compound includes the crystal phase of the Type I silicon clathrate as a main phase, and
   the silicon clathrate compound includes at least a Na element, as the M.

2. The battery according to claim 1, wherein an average secondary particle size of the silicon clathrate compound is 1 μm or more and 40 μm or less.

3. The battery according to claim 1, wherein the average primary particle size of the silicon clathrate compound is 100 nm or more and 1000 nm or less, and
   an average secondary particle size of the silicon clathrate compound is 2 μm or more and 20 μm or less.

4. The battery according to claim 1, wherein the electrolyte layer includes an inorganic solid electrolyte.

5. The battery according to claim 1, wherein the electrolyte layer includes a liquid electrolyte.

6. The battery according to claim 1, wherein the battery is a lithium ion battery.

7. The battery according to claim 1, wherein the battery is a sodium ion battery.

8. The battery according to claim 1, wherein the x satisfies 0<x<6.

* * * * *